June 28, 1927.
G. R. TAAFFE
1,633,797
ADJUSTABLE BEARING MECHANISM FOR DRUMS, SLEEVES, AND THE LIKE
Filed June 21, 1924
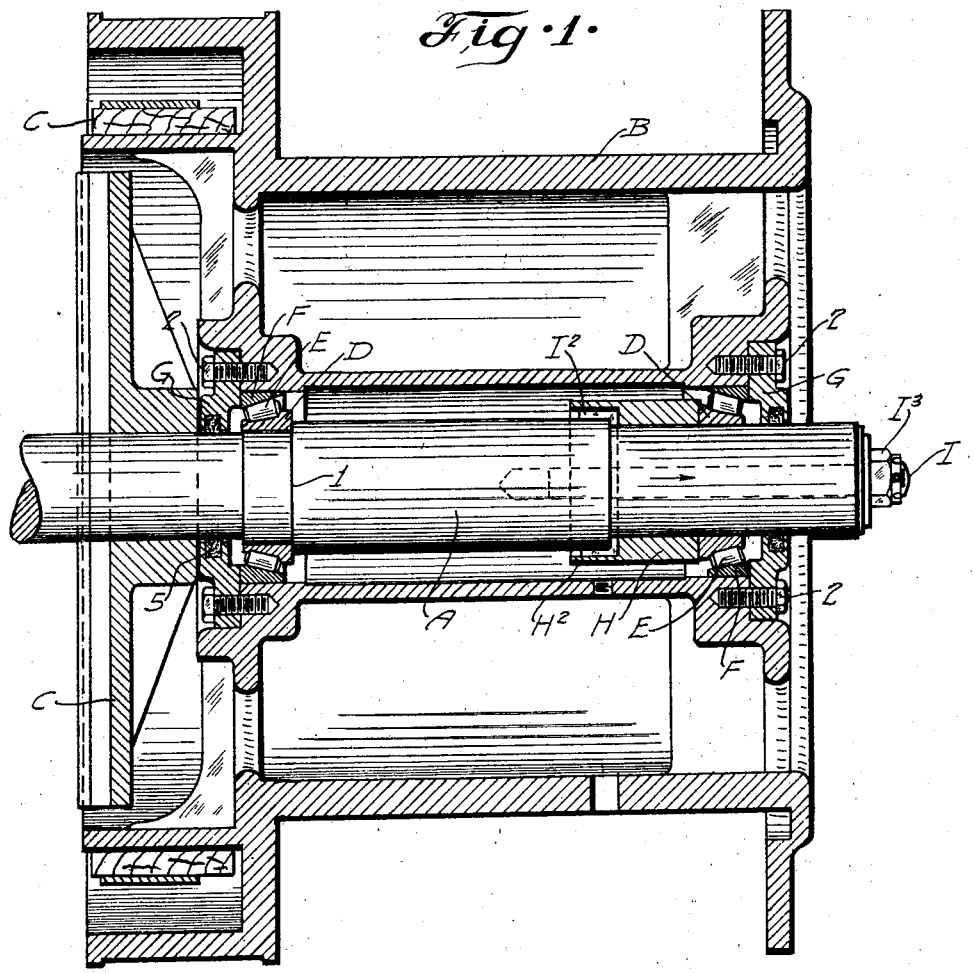
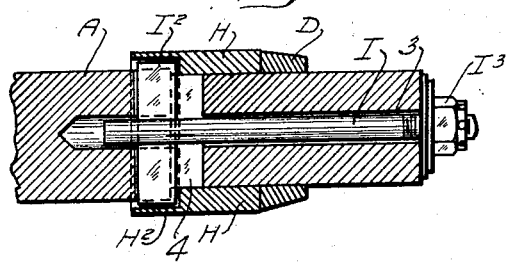
INVENTOR
George R. Taaffe.
By Bakewell & Church
ATTORNEYS Patented June 28, 1927.

1,633,797

UNITED STATES PATENT OFFICE.

GEORGE R. TAAFFE, OF JOPLIN, MISSOURI, ASSIGNOR TO UNITED IRON WORKS, INC., OF JOPLIN, MISSOURI, A CORPORATION OF MISSOURI.

ADJUSTABLE BEARING MECHANISM FOR DRUMS, SLEEVES, AND THE LIKE.

Application filed June 21, 1924. Serial No. 721,467.

This invention relates to hoisting drums of the type commonly referred to as "loose drums", which comprise a rotatable shaft, a drum loosely mounted on said shaft and a clutch for enabling the drum to be connected with the shaft so as to revolve forwardly with the same and disconnected from said shaft so as to permit the drum to revolve rearwardly relatively to the shaft.

The object of the invention is to provide an adjustable bearing mechanism of novel construction that is particularly adapted for use in supporting the opposite ends of a hoisting drum of the general type referred to.

Figure 1 of the drawings is a longitudinal sectional view of a hoisting drum equipped with an adjustable bearing mechanism constructed in accordance with my invention; and Figure 2 is a detail sectional view, illustrating the means that is used for adjusting the bearings.

Referring to the drawings which illustrate the preferred form of my invention, A designates a rotatable shaft that is adapted to be rotated forwardly by any suitable means (not shown), B designates a hoisting drum loosely mounted on said shaft and C designates a clutch of any suitable type for enabling the drum to be connected with said shaft so as to revolve forwardly with same and disconnected from said shaft when it is desired to have the drum revolve rearwardly relatively to the shaft. My invention consists of an adjustable bearing mechanism that is particularly adapted for use in hoisting drums of the general type above referred to, but which is capable of use with various other structures that comprise a shaft and a sleeve or tubular member surrounding said shaft and supported at its ends by friction reducing bearings of any preferred type or kind.

In the preferred form of my invention, as herein illustrated, the drum B is provided at its inner and outer ends with roller bearings, each of which comprises a cone-shaped inner member D, rollers E that travel on the inclined or tapered surface of said inner member and an outer member F provided with a tapered roller engaging surface, said roller bearings being so arranged that they take up the end thrusts on the drum B in opposite directions. The bearing at the inner end of the drum is arranged with its cone or inner member D in engagement with an integral shoulder 1 on the shaft A, and the outer member F of said inner bearing is arranged in engagement with a ring G that is detachably connected to the hub of the drum by removable fastening devices 2. The outer member F of the bearing at the outer end of the drum is also arranged in engagement with a removable ring G that is detachably connected to the hub of the drum by fastening devices 2, but the inner member D of said outer bearing is arranged in engagement with an adjustable abutment H on the shaft A. By moving the adjustable abutment H outwardly or in the direction indicated by the arrow in Figure 1, the cones or inner members D of both bearings will be moved farther apart, and consequently, both of said inner members will be adjusted simultaneously towards their co-operating outer members to compensate for wear on the bearings. Various means can be used for moving the adjustable abutment H, but I prefer to arrange an adjusting screw I in a longitudinally-disposed bore 3 in the outer end of the shaft A and provide said screw I with a transversely-disposed key I² that is arranged in an elongated slot 4 in the shaft A in such a way that when the screw I is moved outwardly by tightening the adjusting nut I³ on same, the key I² will bear against the adjustable abutment H and move said abutment longitudinally of the shaft A towards the outer end of the drum, thus causing the inner members of both bearings to be moved farther apart and towards their co-operating outer members. In order to hold the key I² in operative position in the screw I, the adjustable abutment H is provided with an annular flange H² that laps over the ends of the key I², as shown in Figure 2, and thus prevents said key from moving transversely of the screw I and the shaft H.

The hub of the drum is made of considerably greater diameter than the shaft A so that it will serve as a lubricant holder which can be packed with cup grease, and each of the removable rings G at the ends of the drum is provided with a felt washer or other suitable device that bears against the shaft A, and thus prevents the lubricant from escaping from said lubricant holder.

With a hoisting drum of the construction above described it is not necessary to frequently renew the co-operating bearing surfaces on the drum and on the shaft, as is necessary with the hoisting drums now in general use, due to the fact that rotatable elements such as balls or rollers are arranged between co-operating members on the shaft and at the ends of the drum. Such a hoisting drum is inexpensive to manufacture and assemble and when the bearings of same become worn, said bearings can be adjusted to compensate for wear by simply tightening the nut I³ at the outer end of the shaft A, thus causing the inner members of both bearings to move simultaneously towards their co-operating outer members.

Having thus described my invention, what I claim as new and desire to secure by Letters Patent is:

1. The combination of a shaft, a sleeve surrounding said shaft, friction-reducing bearings arranged between said shaft and sleeve at the opposite ends of the sleeve and comprising inner members mounted on said shaft, and a device arranged between the bearings and operable from one end of the sleeve for moving the inner member of one bearing longitudinally of the shaft away from the inner member of the other bearing so as to simultaneously adjust both bearings to compensate for wear.

2. The combination of a shaft, a sleeve loosely mounted on said shaft, friction-reducing bearings arranged between said shaft and sleeve and each comprising an inner member, an outer member and rotatable elements between said members, an adjustable abutment on the shaft with which the inner member of one bearing contacts, an adjusting screw arranged in a longitudinally-disposed bore in said shaft, and a transversely-disposed key in an elongated slot in said shaft adapted to be actuated by said screw and arranged in engagement with said abutment.

3. The combination of a shaft, a sleeve loosely mounted on said shaft, roller bearings arranged at the opposite ends of said sleeve and each comprising a tapered inner member that surrounds the shaft, a shoulder on the shaft with which the inner member of one bearing contacts, an adjustable abutment with which the inner member of the other bearing contacts, a longitudinally-disposed adjusting screw in said shaft provided with a transversely-disposed key that projects through an elongated slot in said shaft and which is arranged so that it bears against said adjustable abutment, and an annular flange on said abutment that laps over the ends of said key.

4. The combination of a shaft, a sleeve loosely mounted on said shaft and adapted to be filled with a lubricant, oppositely-disposed, tapered roller bearings arranged between said shaft and sleeve at the opposite ends of the sleeve and comprising inner and outer members, means arranged intermediate said bearings and operable from one end of the sleeve for moving the inner member of one bearing longitudinally of the shaft away from the inner member of the other bearing so as to simultaneously adjust both bearings to compensate for wear, and means for preventing the lubricant from escaping from said sleeve.

GEORGE R. TAAFFE.